March 18, 1947.                 I. WOLFF                    2,417,722
PURIFICATION OF LIQUIDS BY SUBJECTING SUCCESSIVELY CONFINED PORTIONS
    OF SAID LIQUID TO SUPERSONIC VIBRATIONS AND SIMULTANEOUSLY
        BUBBLING OXYGEN THROUGH SAID CONFINED PORTIONS
                     Filed July 31, 1942
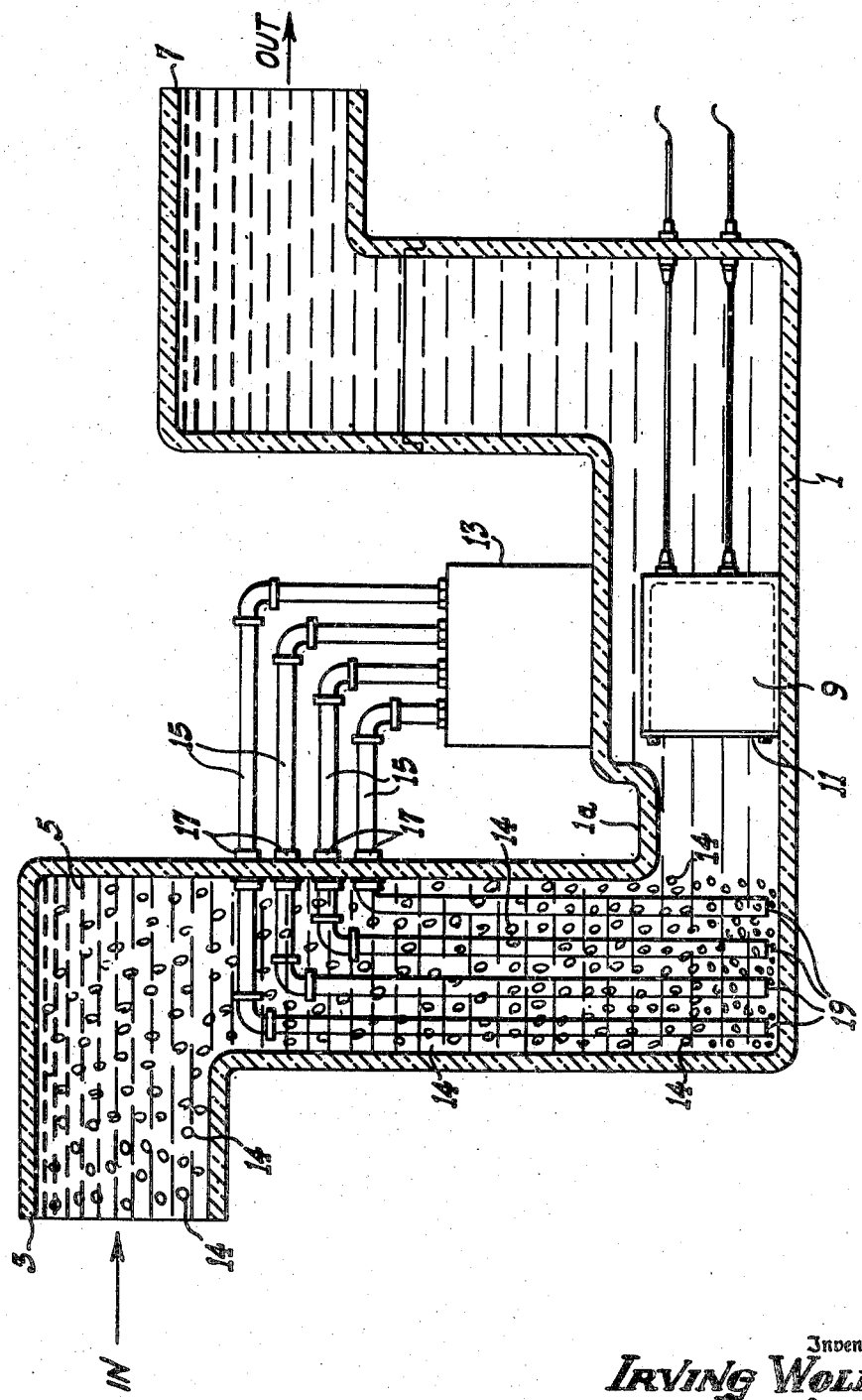
Inventor
IRVING WOLFF
Attorney Patented Mar. 18, 1947

2,417,722

UNITED STATES PATENT OFFICE 2,417,722

PURIFICATION OF LIQUIDS BY SUBJECTING SUCCESSIVELY CONFINED PORTIONS OF SAID LIQUID TO SUPERSONIC VIBRATIONS AND SIMULTANEOUSLY BUBBLING OXYGEN THROUGH SAID CONFINED PORTIONS

Irving Wolff, Haddonfield, N. J., assignor to Radio Corporation of America, a corporation of Delaware Application July 31, 1942, Serial No. 452,988

2 Claims. (Cl. 210—1)

This invention relates to the treatment of liquids, and more particularly to an improved method of and apparatus for purification of liquids.

It has been proposed heretofore to treat liquids such as water, milk, beer, and the like by subjecting the same to sonic vibrations for the purpose of killing bacteria therein. In some cases, it has also been proposed to apply static pressure to the liquid as it flows over a source of sonic vibrations. So far as I am aware, the methods heretofore proposed have not been altogether successful.

The primary object of my present invention is to provide an improved method of and apparatus for treating liquids to effect purification or sterilization thereof by destroying the bacteria therein.

More particularly, it is an object of my present invention to provide an improved, simple, and highly effective method of purifying liquids by means of supersonics.

It is also an object of my present invention to provide an improved method of activating a gas which is normally inactive so as to produce a useful chemical or bacteriological reaction.

In accordance with my present invention, the liquids to be purified are caused to flow through suitable apparatus and successively confined portions of the flowing liquid are subjected to sonic vibrations at a pressure of at least 100 bars, and preferably from about 100 to about 200 bars. Simultaneously, a normally inactive, oxygen containing fluid or gas is passed through the confined vibrating portions of the liquid. This treatment activates the gas to produce a reaction which, in turn, provides highly effective sterilization which the use of even a very high intensity sonic wave alone will not provide.

The novel features that I consider characteristic of my invention are set forth in particularity in the appended claims. The invention itself, however, as well as additional objects and advantages thereof, will best be understood from the following description when read in connection with the accompanying drawing in which the single figure is a view partly in section and partly in elevation illustrating one form of apparatus which may be employed in carrying out the present invention.

Referring more particularly to the drawing, there is shown a container in the form of a somewhat U shaped tank 1 having an inlet 3 through which the liquid 5, such as water, milk, or the like, to be purified is admitted into the tank. After treatment, the liquid 5 leaves the tank 1 through an outlet 7. A pump (not shown) may be employed for forcing the liquid 5 through the tank 1, or a head may be provided between the inlet 3 and the outlet 7 sufficient to cause the flow of liquid through the tank.

Within the tank 1 is a generator 9 which includes a suitable driving unit (for example, a magnetostrictive driver) adapted to drive a diaphragm 11 at suitable frequencies to set up sonic vibrations in the liquid 1. The portion 1a of the tank 1 adjacent the diaphragm 11 may be suitably formed of smaller cross-section than the remainder of the tank in order to make sure that the portion of the water or other liquid 5 confined by the tank 1 in the vicinity of the diaphragm 11 will be subjected to the sonic vibrations.

Resting on the tank 1 is a source 13 for supplying a suitable gas 14, such as oxygen, air, carbon dioxide, or any other normally inactive gas which contains oxygen, either in the free form or in the combined form. If the gas contains oxygen in the free form, as in the case of pure oxygen or air, the sonic vibrations will transform the oxygen into ozone. If the gas contains oxygen in the combined form, as in carbon dioxide, it should be one which either can react with the liquid under the influence of the sonic vibrations or will itself be activated by the sonic vibrations to liberate free oxygen as ozone. A plurality of tubes or conduits 15 connect the gas source 13 to fluid tight couplings 17 on the tank 1, and a plurality of downwardly extending tubes 19 which terminate adjacent the bottom of the tank 1 are also connected to the couplings 17. The gas supplied by the source 13 may be forced, under pressure, through the conduits 15 and 19 and into the bottom of the tank, the gas 14 thereafter bubbling up through the vibrating portion of the liquid 5. The conduits or tubes 19 should preferably terminate in the neighborhood of the generator or sonic vibration source 9, so as to insure passage of the gas through the successive, vibrating portions of the confined liquid.

The above described treatment of the liquid will effect far better purification thereof than can be realized by merely subjecting the liquid to the supersonic vibrations alone. The vibrations are preferably delivered to the liquid from the diaphragm 11 at pressures of between 100 and 200 bars, but other pressures may be employed depending upon the nature of the liquid. The frequencies of the sonic vibrations may be either within the audible range or within the super-audible range, as may be found most suitable.

Although I have described my invention in considerable detail, it will be apparent to those skilled in the art that many variations thereof are possible other than the specified one herein described. I therefore desire that my invention shall not be limited except insofar as is made necessary by the prior art and by the spirit of the appended claims.

I claim as my invention:

1. The method of sterilizing a liquid which comprises flowing said liquid in a continuous stream through a conduit, subjecting successively confined portions of said liquid in said conduit to supersonic vibrations, and simultaneously bubbling oxygen through said confined portions while said portions are being vibrated.

2. The method of sterilizing a liquid which comprises flowing said liquid in a continuous stream through a conduit, subjecting successively confined portions of said liquid to supersonic vibrations at a pressure of at least 100 bars, and simultaneously bubbling oxygen through said confined portions while said portions are being vibrated.

IRVING WOLFF.

REFERENCES CITED

The following references are of record in the file of this patent:

UNITED STATES PATENTS

| Number | Name | Date |
| --- | --- | --- |
| 1,006,992 | Wiener | Oct. 24, 1911 |
| 2,163,650 | Weaver | June 27, 1939 |
| 2,138,839 | Chambers | Dec. 6, 1938 |
| 2,096,011 | Smith | Oct. 19, 1937 |
| 1,662,180 | Ball | Mar. 13, 1928 |
| 1,983,968 | Clark | Dec. 11, 1934 |
| 850,416 | Bridge | Apr. 16, 1907 |
| 1,900,809 | Hammerly | Mar. 7, 1933 |
| 2,033,121 | Chambers | Mar. 10, 1936 |

FOREIGN PATENTS

| Number | Country | Date |
| --- | --- | --- |
| 231,271 | German | Feb. 20, 1911 |